(12) United States Patent
Heath

(10) Patent No.: US 7,716,633 B1
(45) Date of Patent: May 11, 2010

(54) METHOD FOR EXTENDING THE LIFE AND UTILITY OF AN EXISTING PERSONAL COMPUTER BY ADDING INSTANT-ON EMBEDDED FUNCTIONS

(76) Inventor: Chester A. Heath, 884 Nafa Dr., Boca Raton, FL (US) 33487

( * ) Notice: Subject to any disclaimer, the term of this patent is extended or adjusted under 35 U.S.C. 154(b) by 1276 days.

(21) Appl. No.: 11/129,496

(22) Filed: May 16, 2005

Related U.S. Application Data

(60) Provisional application No. 60/571,507, filed on May 17, 2004.

(51) Int. Cl.
*G06F 9/44* (2006.01)
*G06F 13/00* (2006.01)

(52) U.S. Cl. .............. 717/106; 717/108; 710/300; 710/301; 710/302; 710/303; 710/304

(58) Field of Classification Search .......... 717/100, 717/120, 121, 122, 159, 175, 174, 102–113; 710/300–304
See application file for complete search history.

(56) References Cited

U.S. PATENT DOCUMENTS

| | | | |
|---|---|---|---|
| 4,975,950 A | 12/1990 | Lentz | |
| 5,121,345 A | 6/1992 | Lentz | |
| 5,134,580 A | 7/1992 | Bertram et al. | |
| 5,787,491 A * | 7/1998 | Merkin et al. | 711/173 |
| 5,805,882 A | 9/1998 | Cooper et al. | |
| 5,822,582 A | 10/1998 | Doragh et al. | |
| 5,884,073 A | 3/1999 | Dent | |
| 6,003,130 A | 12/1999 | Anderson | |
| 6,003,131 A | 12/1999 | Lee et al. | |
| 6,009,520 A | 12/1999 | Gharda | |
| 6,158,002 A * | 12/2000 | Kwan et al. | 713/2 |
| 6,161,177 A | 12/2000 | Anderson | |
| 6,205,513 B1 | 3/2001 | Godicke et al. | |
| 6,292,890 B1 | 9/2001 | Crisan | |
| 6,367,007 B1 | 4/2002 | Do | |
| 6,421,777 B1 | 7/2002 | Pierre-Louis et al. | |
| 6,463,537 B1 | 10/2002 | Tello | |
| 6,477,642 B1 | 11/2002 | Lupo | |
| 6,560,702 B1 | 5/2003 | Gharda et al. | |
| 6,564,318 B1 | 5/2003 | Gharda et al. | |
| 6,622,244 B1 | 9/2003 | Eidson et al. | |
| 6,785,808 B2 | 8/2004 | Huntington et al. | |
| 6,859,876 B2 | 2/2005 | Dykes et al. | |
| 2004/0107016 A1 | 6/2004 | Geeng | |

OTHER PUBLICATIONS

Rubini, Alessandro. "Tour of the Linux Kernel Source". The HyperNews Linux KHG Discussion Page. 1994.*

* cited by examiner

*Primary Examiner*—Wei Y Zhen
*Assistant Examiner*—Satish Rampuria
(74) *Attorney, Agent, or Firm*—PRTSI, Inc.; Martin D. Moynihan

(57) ABSTRACT

The present invention provides a method and apparatus for converting, through add-on hardware and code, any of a variety of types and vintages of general purpose personal, laptop, or notebook computers to be an efficient, secure, dedicated system which run independently of the host system's resident operating system.

13 Claims, 6 Drawing Sheets

US 7,716,633 B1

METHOD FOR EXTENDING THE LIFE AND UTILITY OF AN EXISTING PERSONAL COMPUTER BY ADDING INSTANT-ON EMBEDDED FUNCTIONS

This application is the non-provisional counterpart of U.S. Provisional Application No. 60/571,507 filed on May 17, 2004. This application claims the benefit and priority to U.S. Provisional 60/571,507, said provisional application being incorporated by reference herein in its entirety.

FIELD OF THE INVENTION

The present invention relates to an add-on modification to a personal, laptop, or notebook computer system that converts that system from a general purpose, stand-alone system with networking capabilities to a dedicated, secure, networking interface that by-passes the system's resident operating system and hard drive.

BACKGROUND

With the technical lifetime of a present day personal, laptop, or notebook computer being only three to five years, there is a tremendous waste as these obsolete systems are discarded. This results in, not only a monetary loss for the user, but also represents an environmental concern.

Generally, there has been little done toward extending the useful life of a computer system. In some cases, performance may be enhanced to extend the system's life. In U.S. Pat. No. 5,610,801, "Motherboard assembly which has a single socket that can accept a single integrated circuit package or multiple integrated circuit packages", by D. Dent, U.S. Pat. No. 5,610,801, "Motherboard assembly which has a single socket that can accept a single integrated circuit package or multiple integrated circuit packages", by G. Begis, and U.S. Pat. No. 5,384,692, "Socket with in-socket embedded integrated circuit", by K. Jaff, pluggable replacement or co-processor chips are taught. In U.S. Pat. No. 6,111,757 "SIMM/DIMM memory module" by Timothy Jay Dell et al. al. and U.S. Pat. No. 5,428,762, "Expandable memory having plural memory cards for distributively storing system data", by Brian W. Curran, et al. storage capacity is enhanced through memory add-on cards. There has not been, however, ways to override or capture the system from its resident operating system. One could possibly upgrade to a more advanced operating system as in U.S. Pat. No. 5,765,201, "Changing page size in storage media of computer system", by Mark Gregory Manges, et al. but this is usually costly as upgrades in the system's hardware is desirable to take advantage of the new operating system's features. What is more likely to happen is that the user will replace the entire system at a comparable cost to the operating system and hardware upgrade.

There are other problems with using conventional systems to interface with a network such as the World Wide Web Internet. One such problem is exposing the system to destructive or nuisance viruses or pop-ups. A second problem is the susceptibility to system clogging E-mail Spam. A third problem is the vulnerability of the user's data security and the user's privacy. A fourth problem is the instability of today's complex operating systems resulting in irrecoverable, "fatal", errors which require the system to be restarted, its hard drive scanned for errors, the fixing of the errors, and the loss of any unsaved data.

SUMMARY

It is the objective of the present invention, therefore, to overcome all the problems and shortcomings discussed above involving the use of conventional personal, laptop or notebook computer systems and their interface to a network.

It is a further objective to provide a personal, laptop, or notebook computer system as an interface to a network that is independent of and by-passes the system's resident operating system.

It is a further objective to substitute a non-persistent storage for the system's hard drive to alleviate or eliminate problems of Spam, viruses, and privacy/security resulting from connection to the network.

Finally, it is an objective of the present invention to allow a user to salvage his current, obsolete or near obsolete personal, laptop, or notebook computer system and to continue its use as a high performing, more user friendly, and more secure network interface.

These objectives are achieved by introducing to the user's personal, laptop, or notebook system an inexpensive, easy-to-install, add-on card that, after installation, will "hijack" the system sometime during the system's boot-up operation, preferably during the time of ROM Scan, take control of the system, and utilize the system's I/O, CPU, RAM, and bus architecture to provide, along with its own storage system, the interface to the network.

DETAILED DESCRIPTION OF THE INVENTION

Figure 1:
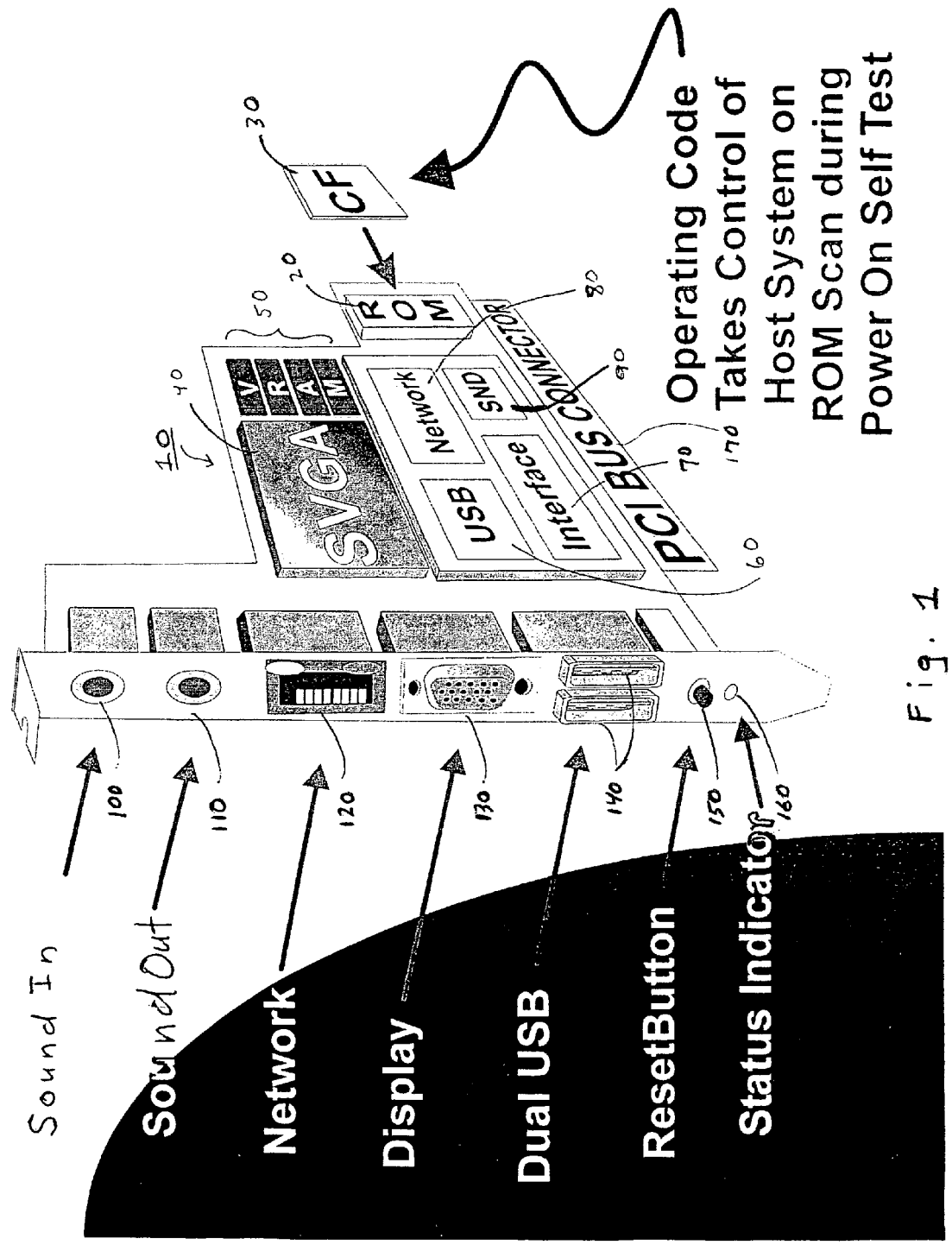
FIG. 1 shows a PCI adapter card as described by this invention.

FIG. 1 shows a PCI adapter card 10 of the present invention, which is designed to be plugged into the system board of a host PC to be converted to an interne appliance. Once plugged in, and the PC is powered on, the PC will begin its boot-up routine. When the system is in its power-on-self-test ROM scan subroutine, it will detect and turn over control to the PCI adapter's ROM 20. Operating code programmed into ROM 20 will then take control of the host system. The ROM 20 may be read mostly memory. The ROM 20 may be in the form of a pluggable compact flash, CF, module 30 for flexibility and future updates through vendor exchange, downloading, etc. Also the ROM 20 may be in the form of dongle, CD-ROM or disk.

The PCI adapter card 10 of FIG. 1 also contains a super video graphics adapter (SVGA) 40, one or more video RAM (VRAM) modules 50, a USB interface module 60, a PCI/USB interface module 70, a network interface module 80, and an SND module 90.

The PCI adapter card 10 of FIG. 1 also contains external sockets, including, but not limited to, Sound In 100, Sound Out 110, Network 120, Display 130, and one or more USB sockets 140. Also included are a Reset button 150 and a Status Indicator 160. The PCI adapter card 10 also has a PCI bus connector 170.

Figure 2:
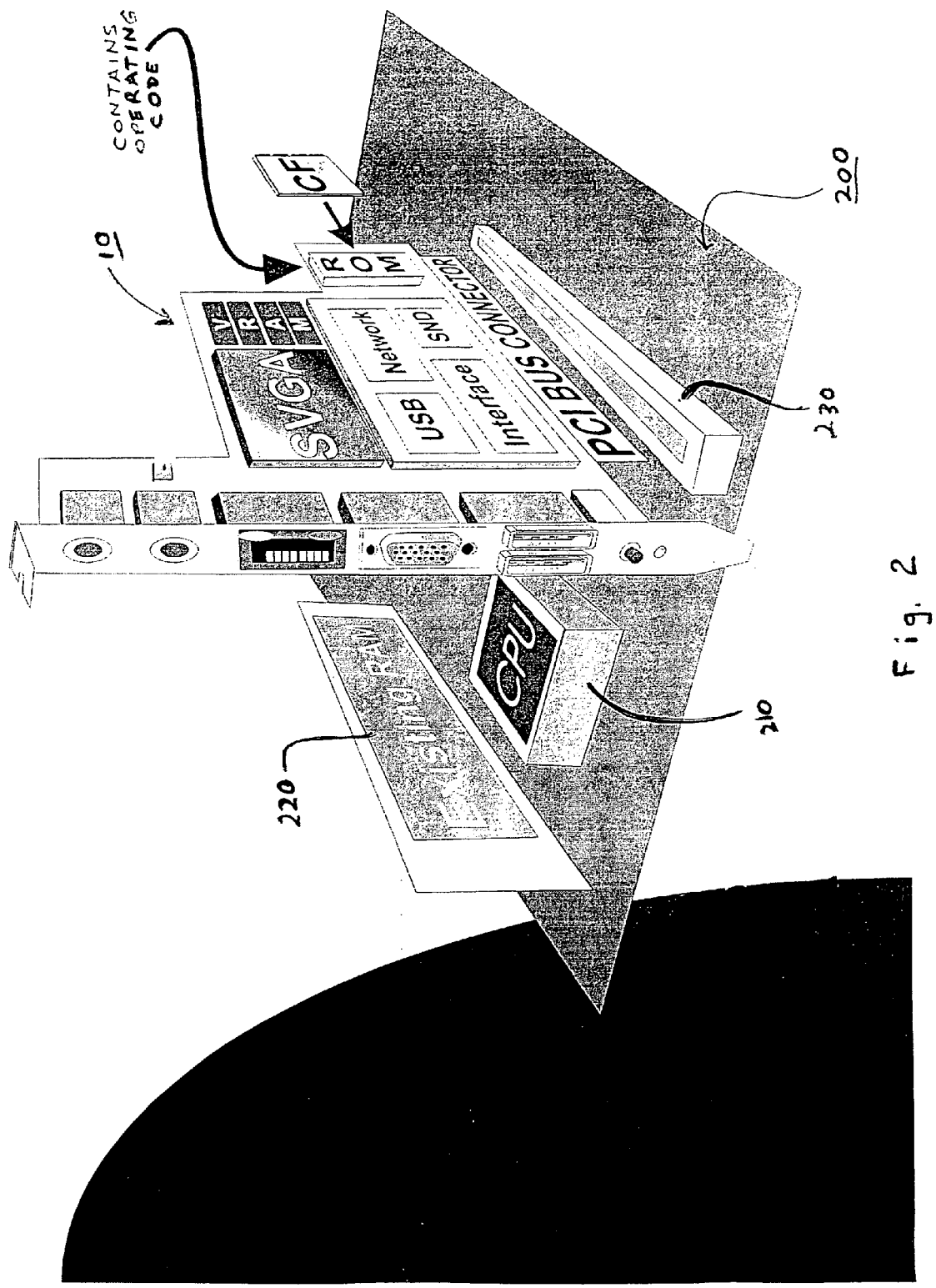
FIG. 2 shows the PCI adapter card positioned to be inserted into a host PC system board.

FIG. 2 shows the adapter card positioned above the host computer's system board 200 (not part of this invention). The host's system board 200 will include its CPU 210, existing RAM 220, and a PCI bus socket 230 which will accommodate the PCI bus connector 170.

Figure 3:
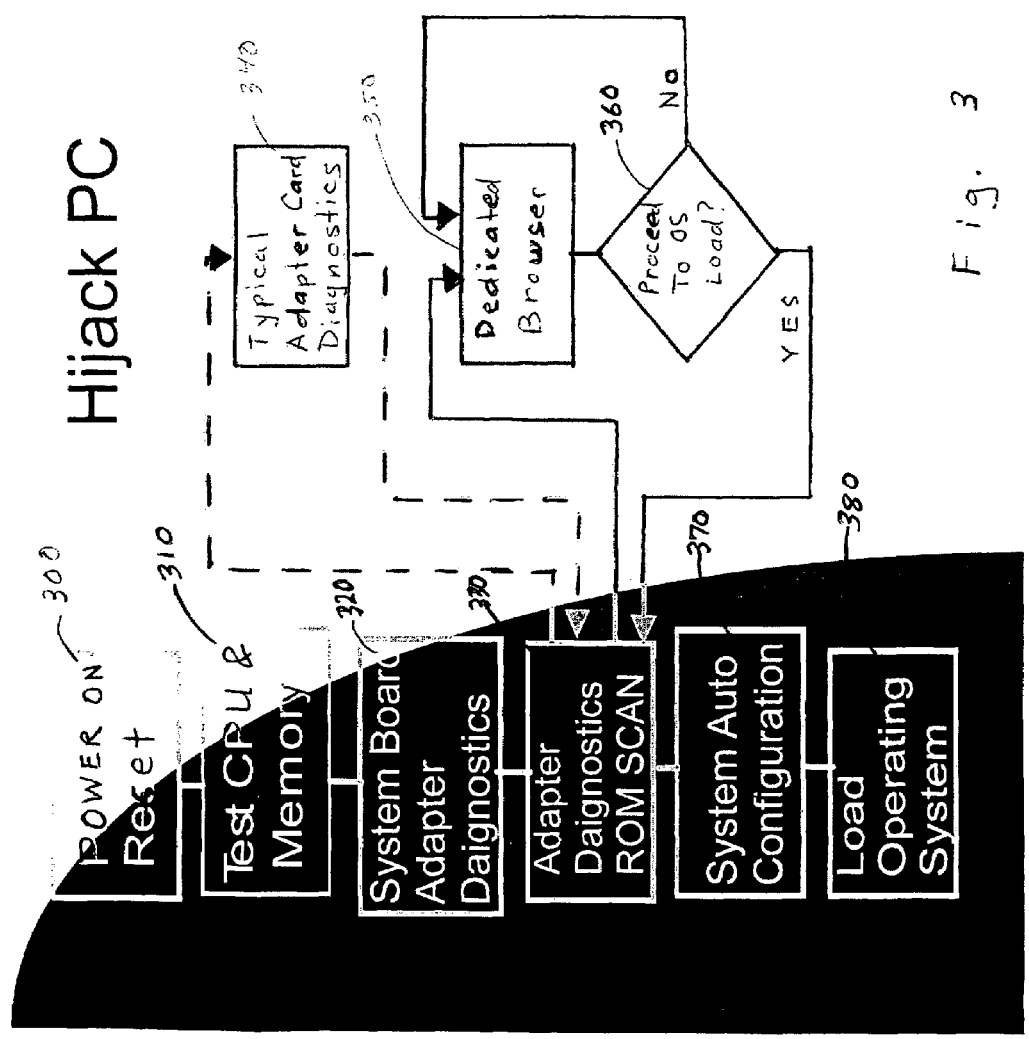
FIG. 3 shows a flow chart illustrating the steps involved in the invention for the PCI adapter card to take control of the host system.

FIG. 3 is a flow diagram of the steps that occur when the host, with the adapter card plugged in, is powered on. In step 320 the system goes into its system board adapter diagnostics. Once in the system board adapter diagnostics, it enters the adapter diagnostics ROM Scan step 330.

Normally, during ROM Scan, the system scans bus addresses, looking for ROM mounted on an adapter card. If ROM is found, the system allows ROM 20 to take over control of system to run the card's diagnostics. Typically, control is returned to the system at the end of card diagnostics as shown in step 340.

In this invention, however, the PCI adapter card 10 "hijacks" the system and takes over its control by not releasing control of the system back to the host, before system control is passed to the host's operating system, OS. The PCI adapter card 10 then moves into its embedded application, such as, as illustrated in step 350, a dedicated browser application, a preferred embodiment. Such an application may be Linux based so as to circumvent and be completely independent of the host's operating system. It may be decided, after entering into the application, to remain in the application or proceed to the OS load control where control is turned back over to the host and where the host routine will move into system auto configuration step 370 and on to loading of the operating system step 380. Other embodiments of embedded applications that could reside in the card's ROM 20 include dedicated modem or network browsers, process control for home automation, print buffers, post script engines, virtual private networks, and firewalls.

Figure 4:
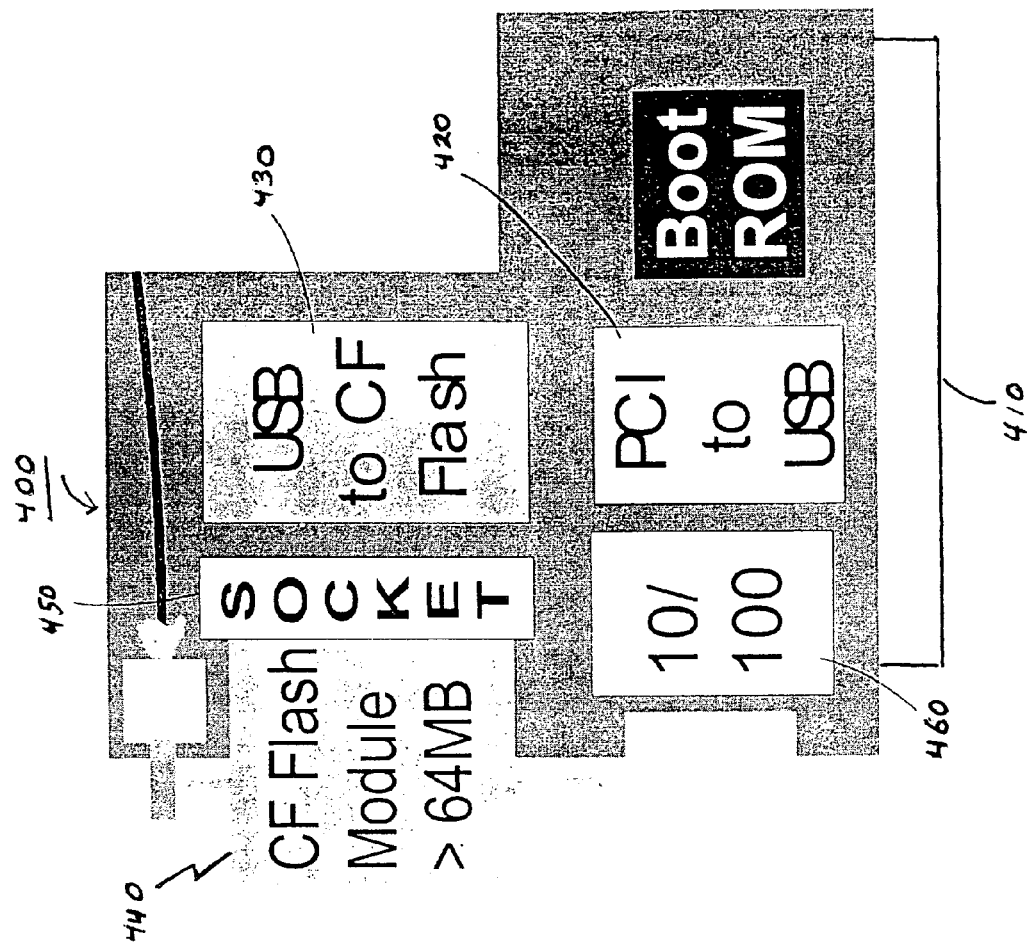
FIG. 4 shows the configuration of the Boot ROM portion of the adapter card designed for most desktop PC's.

An adapter according to the present invention may be designed for desktop PC, notebook/laptop PC, or wireless PC applications. FIG. 4 shows a Boot ROM portion 400 of an adapter card. This configuration would apply to many existing PC's. Again, the card will be interconnected to the host through its PCI bus connector 410, converts to USB through interface 420 which links, in turn, through a second interface 430, to a CF flash module 440 seated in a socket 450. Second interface 430 is a USB to CF flash interface. Also included is a 100/110 Ethernet port 460.

Figure 5:
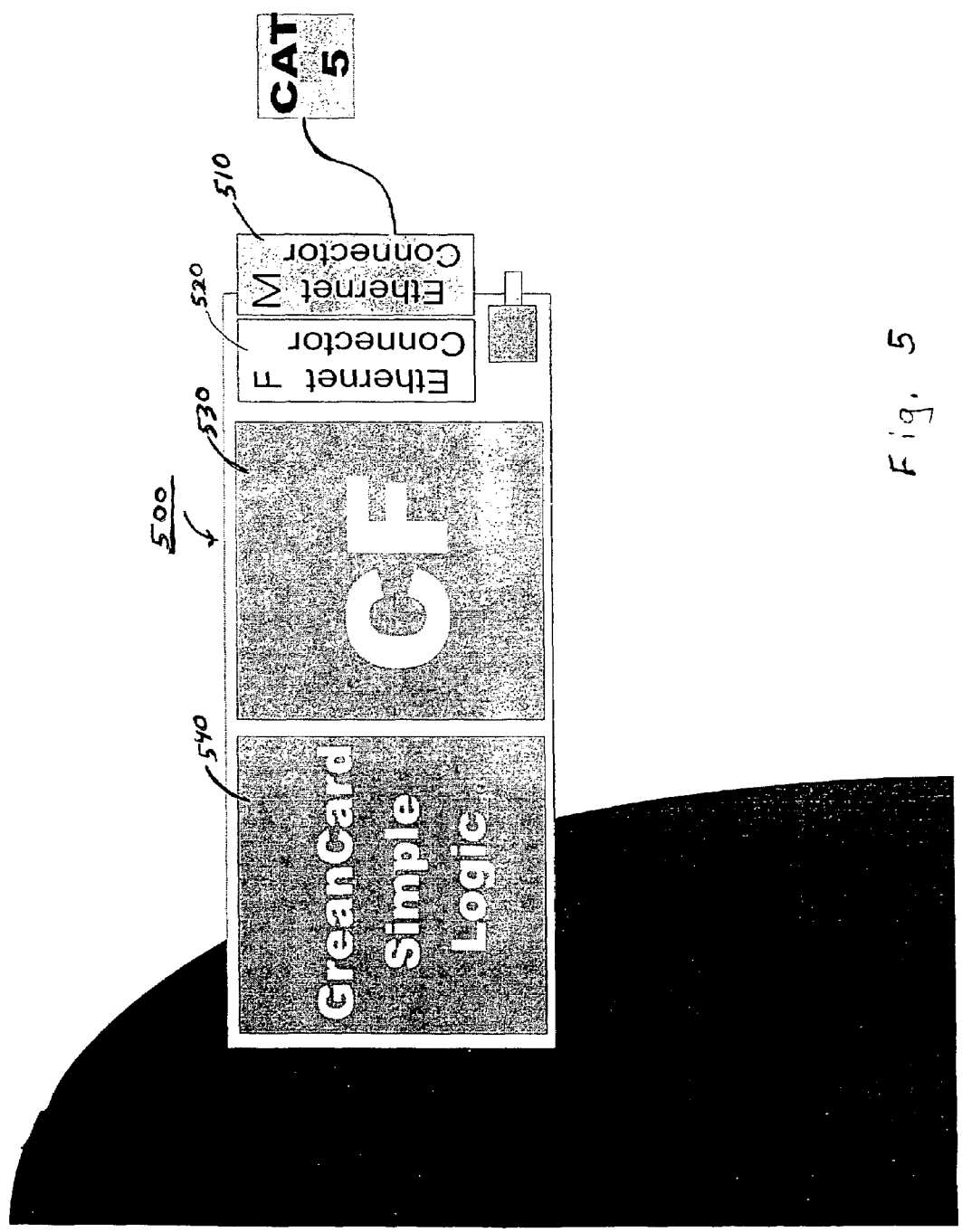
FIG. 5 shows the configuration of the Boot ROM portion of the adapter card for notebook/laptop PC's.

A notebook/laptop Boot ROM portion 500 of the adapter card would be configured as illustrated in FIG. 5. Included are an M type ethernet connector 510, an F type ethernet connector 520, the compact flash section 530, and a logic section 540.

Figure 6:
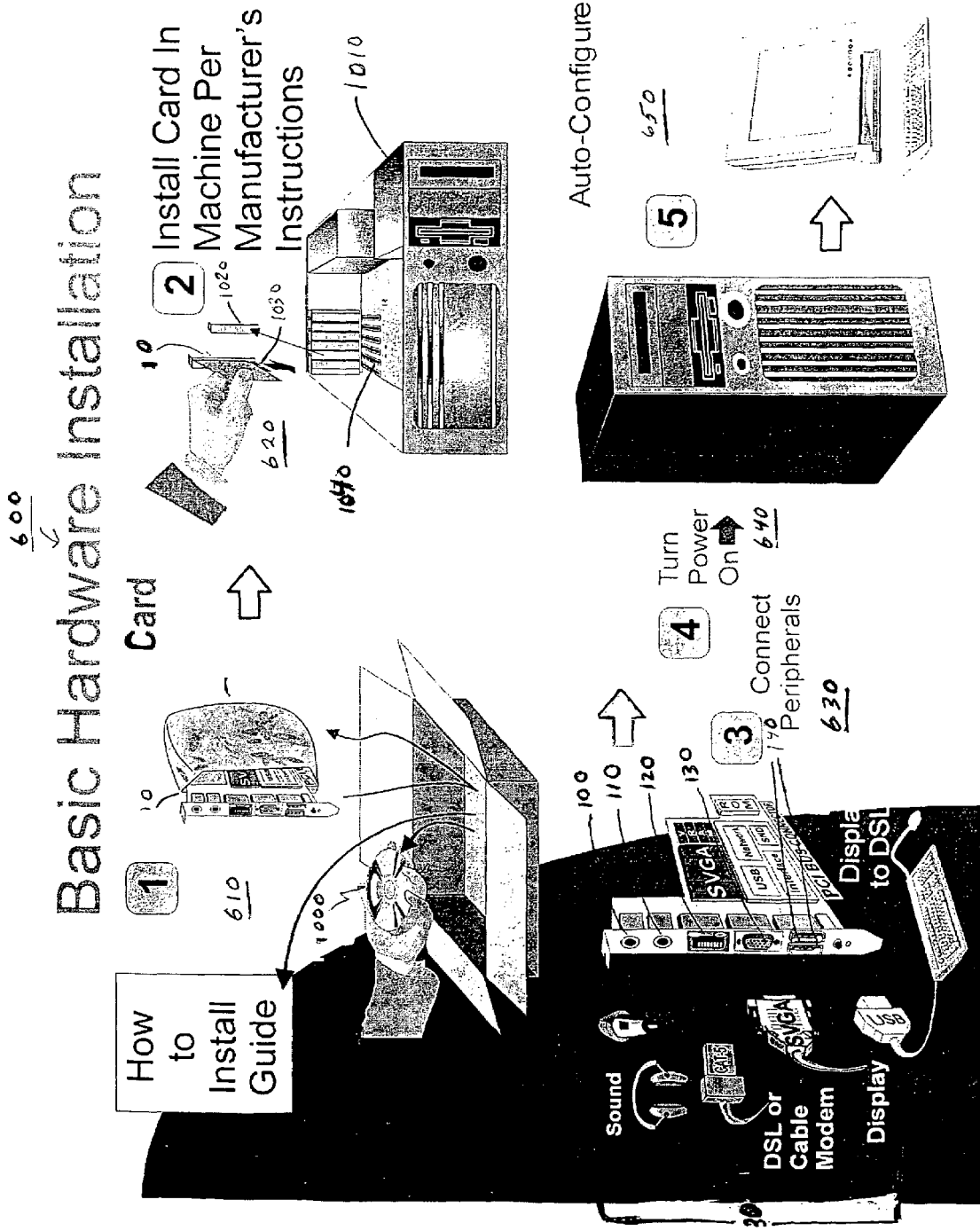
FIG. 6 shows, pictorially, the installation steps involved for implementing the present invention.

The adapter card 10 can be installed by anyone of minimal hardware skills. The steps for installation are illustrated in FIG. 6. In step 610 the card 10 and its software 1000 are removed from the shipping package.

In step 620, after removing the cover (not shown) of the host computer 1010 and after removing the back slot cover 1020, the card connector 1030 is inserted into the slot's mating connector 1040.

Following this, in step 630 the peripheral plugs and connectors 180 are connected to their mating connectors or jacks 100, 110, 120, 130, and 140 on the connecting edge of the card 20 at the back of the host computer 1010.

The last step 640 is to turn on the power of the host 1010 which will cause the system to auto configure to the new application in step 650.

In the preferred embodiment, the dedicated browser is implemented without persistent memory or read/write memory but instead uses a "golden" image of the application which is loaded into the read mostly storage from a known clean, virus free, source, such as, but not limited to a manufacturer's CD-ROM or a provider's clean source website. Thus, when the system is reset or powered on the next time, the "golden" image will be downloaded providing a self-healing browser.

Writing to storage will be limited, only allowable under certain circumstances. A user invoked manual pushbutton is provided (not shown) to prevent surreptitious writing to the read mostly storage by viruses.

While the present invention has been described in conjunction with specific embodiments, it will be understood that those skilled in the art, both now and in the future, will contemplate numerous modifications, alternatives, variations, improvements and enhancements. Accordingly, it is intended to embrace all such modifications, alternatives, variations, improvements and enhancements as fall within the spirit and broad scope of this invention and any appended claims.

What is claimed:

1. A method of converting, at boot-up, a general purpose host computer system, said host computer system including a resident operating system and host system power-on-self test (POST) code, into an application specific, dedicated system that can operate an interface and by-pass the resident operating system; said method comprising:

providing an alternate source of POST code;

substituting at least a portion of the POST code from the alternate source of POST code for, at least, a portion of the host system POST code while keeping the host system unchanged;

substituting the alternate source of POST code as a default boot device, wherein the substituted POST code, obtained from the alternate source of POST code, changes the system's start-up sequence and hijacks the system, for one or more subsequent power-on cycles, during a single power-on cycle;

configuring the system, including the system's I/O, using the alternate source of POST code as the default boot device; and loading, from a local or remote source, and running a specific embedded application.

2. The method of claim 1 wherein the substituted POST code, obtained from the alternate source of POST code, changes the system's start-up sequence and hijacks the system from the system POST each time the system is powered on.

3. The method of claim 1 wherein the substitution of the POST code from the alternate source of POST code leads to an alternate boots device, selection of said alternate boot device being made during a ROM scan portion of the system's boot-up sequence.

4. The method of claim 1 wherein the specific embedded application is sourced from a virus free master copy of the application, whereby said virus free master copy is downloaded from read mostly memory each time the system is powered up.

5. The method of claim 1 wherein the dedicated application is an application selected from the group consisting of a browser, a modem, print buffer, post script engine, virtual private network, and firewall.

6. The method of claim 1 with an additional step comprising a return of control to the resident operating system for, at least the step of auto configuration, sometime after the specific embedded application has had control.

7. A method of converting, at boot-up, a general purpose host computer system, said host computer system including a resident operating system and host system power-on-self test (POST) code, into an application specific, dedicated system that can operate an interface and by-pass the resident operating system; said method comprising:

providing an alternate source of POST code;

substituting at least a portion of the POST code from the alternate source of POST code for, at least, a portion of the host system POST code while keeping the host system unchanged;

substituting the alternate source of POST code as a default boot device, wherein the substituted POST code, obtained from the alternate source of POST code, changes the system's start-up sequence and hijacks the system, for one or more subsequent power-on cycles, during a single power-on cycle;

configuring the system, including the system's I/O, using the alternate source of POST code as the default boot device;

selecting and running an alternate operating system; and loading, from a local or remote source, and running a specific embedded application.

8. The method of claim 7 wherein the substituted POST code, obtained from the alternate source of POST code, changes the system' start-up sequence and hijacks the system from the system POST each time the system is powered on.

9. The method of claim 7 wherein the substitution of the POST code from the alternate source of POST code leads to an alternate boot device, selection of said alternate boot device being made during a ROM scan portion of the system's boot-up sequence.

10. The method of claim 7 wherein the specific embedded application is sourced from a virus free master copy of the application, whereby said virus free master copy is downloaded from read mostly memory each time the system is powered up.

11. The method of claim 7 wherein the dedicated application is an application selected from the group consisting of a browser, a modem, print buffer, post script engine, virtual private network, and firewall.

12. The method of claim 7 with an additional step comprising a return of control to the resident operating system for, at least the step of auto configuration, sometime after the specific embedded application has had control, without having to re-boot the system or by invoking a command to not hijack the system POST on the next power-on.

13. A method of converting, at boot-up, a general purpose host computer system, said host computer system including a resident operating system and host system power-on-self test (POST) code, into an application specific, dedicated system that can operate an interface and by-pass the resident operating system; said method comprising:

providing an alternate source of POST code;

substituting at least a portion of the POST code from the alternate source of POST code for, at least, a portion of the host system POST code while keeping the host system unchanged;

substituting the alternate source of POST code as a default boot device, wherein the substituted POST code, obtained from the alternate source of POST code, changes the system's start-up sequence and hijacks the system, for one or more subsequent power-on cycles, during a single power-on cycle;

configuring the system, including the system's I/O, using the alternate source of POST code as the default boot device; and loading, from a local or remote source, and running a specific embedded application wherein writing to the embedded application residing in read mostly storage mounted on a pluggable card or system board in the computer system is controlled by providing a user invoked manual switch on the pluggable card or system board or elsewhere on the system to give a user an option to either allow or prevent the writing.

* * * * *